United States Patent
Nakagawa

[11] 4,094,588
[45] June 13, 1978

[54] LARGE-APERTURE PHOTOGRAPHIC LENS SYSTEM

[75] Inventor: Jihei Nakagawa, Higashimurayama, Japan

[73] Assignee: Olympus Optical Co., Ltd., Japan

[21] Appl. No.: 694,644

[22] Filed: Jun. 10, 1976

[30] Foreign Application Priority Data

Jun. 14, 1975 Japan ................................ 50-72257

[51] Int. Cl.² ............................................. G02B 9/62
[52] U.S. Cl. ..................................... 350/215; 350/176
[58] Field of Search ................................ 350/176, 215

[56] References Cited

U.S. PATENT DOCUMENTS

| 3,451,745 | 6/1969 | Kazamaki et al. ............... 350/176 |
| 3,552,829 | 1/1971 | Marquardt ........................ 350/215 |
| 3,738,736 | 6/1973 | Shirmizer ......................... 350/215 |

FOREIGN PATENT DOCUMENTS

| 1,120,335 | 7/1968 | United Kingdom ............... 350/215 |

*Primary Examiner*—Paul A. Sacher
*Attorney, Agent, or Firm*—Cushman, Darby & Cushman

[57] ABSTRACT

A Gauss type compact standard photographic lens system comprising a first positive meniscus lens component, a second positive meniscus lens component, a third negative meniscus lens component, a fourth negative cemented meniscus lens component, a fifth positive meniscus lens component and a sixth positive lens component, said photographic lens system being so designed as to prevent flare due to coma from being produced, and favorably correct spherical aberration as well as chromatic aberration of spherical aberration.

2 Claims, 9 Drawing Figures

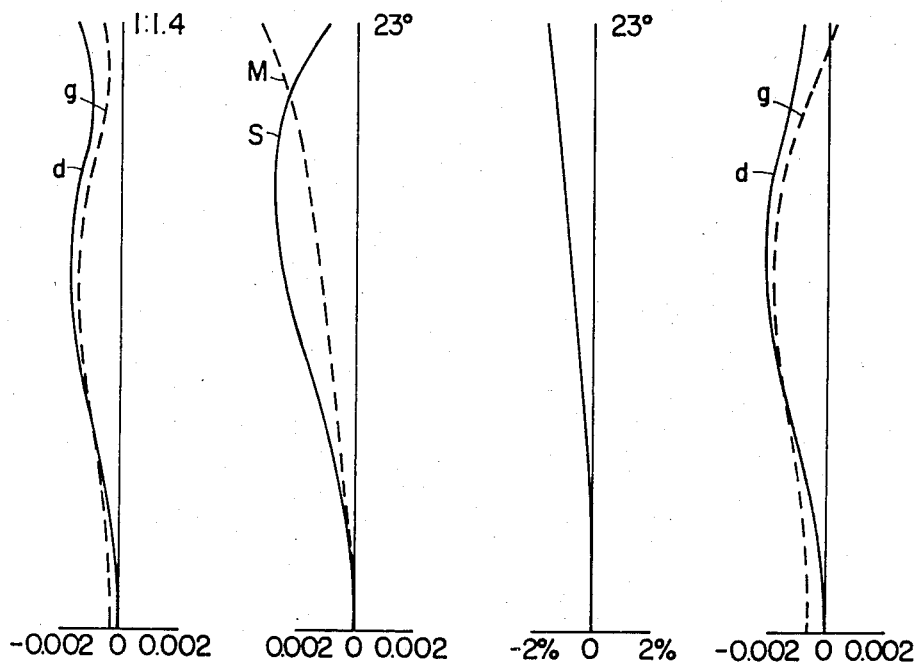

LARGE-APERTURE PHOTOGRAPHIC LENS SYSTEM

BACKGROUND OF THE INVENTION

1. Field of the Invention

The present invention relates to a Gauss type standard photographic lens system having a large aperture ratio.

2. Description of the Prior Art

General photographic lens systems are designed mainly for favorably correcting aberrations for photographing objects at infinite distance. In recent days, however, lens performance for photographing objects at short distance is also important as well as that for photographing object at infinite distance. It is therefore ideal for a photographic lens system that it has excellent performance for photographing objects both at infinite and short distances and that the performance changes little for photographing objects at infinite and short distances. Gauss type standard photographic lenses show some degradation in performance, though not so remarkably, for photographing object at short distance. This degradation in performance can be traced mainly to aggravation of spherical aberration, especially that of short-wavelength rays which degrades image contrast.

Though a remarkable progress has recently been made in Gauss type standard photographic lens systems, the above-mentioned defect still remains in such a type of photographic lens systems that are made of glass materials having high refractive indices. For designing Gauss type standard photographic lens systems which are capable of assuring sharp image contrast, on the other hand, problems are unavoidably posed to correct flare due to coma at intermediate angle which is inherent in Gauss type lens systems and to favorably correct chromatic aberration of spherical aberration. For solving these problems, it is obliged to use glass material having a large Abbe's number, which in turn forces to adopt glass materials having low refractive indices for positive lens components. Such a selection of glass materials will bring about a drawback that it unavoidably aggravates spherical aberration and increases entire lengths of the lens systems as a whole.

SUMMARY OF THE INVENTION

A primary object of the present invention is to provide a compact Gauss type standard photographic lens system having a large aperture ratio wherein flare due to coma, spherical aberration and chromatic aberration of spherical aberration, are favorably corrected.

Another object of the present invention is to provide a large-aperture photographic lens system wherein aberrations are favorably corrected for photographing objects both at infinite and short distances.

The photographic lens system according to the present invention comprises six lens components of seven elements: a first positive meniscus lens component, a second positive meniscus lens component, a third negative meniscus lens component, a fourth negative cemented meniscus doublet lens component, a fifth positive meniscus lens component and a sixth positive lens component. The photographic lens system according to the present invention is characterized by the fact it satisfies the following conditions:

$$r_6 < |r_7| < 1.1r_6 \quad (1)$$
$$0.48f < |r_9| < 0.55f \quad (2)$$
$$0.4f < |r_{11}| < 0.48f \quad (3)$$
$$0.45f < D_a < 0.5f \quad (4)$$
$$0.12f < D_b < 0.15f \quad (5)$$
$$0.35 < \frac{v_1 + v_2 - v_3}{2v_3} < 0.5 \quad (6)$$

wherein the reference symbols are defined as follows:
- $f$: focal length of the entire lens system as a whole
- $r_6$: radius of curvature on the image side surface of the third lens component
- $r_7$: radius of curvature on the object side surface of the fourth lens component
- $r_9$: radius of curvature on the image side surface of the fourth lens component
- $r_{11}$: radius of curvature of the image side surface of the fifth lens component
- $D_a$: total length of the distance as measured from the object side surface of the second lens component to the object side surface of the fourth lens component (i.e., thickness of the second lens component $d_3$ + thickness of the third lens component $d_5$ + airspace between the second and third lens components $d_4$ + airspace between the third and fourth lens components $d_6$)
- $D_b$: thickness of the fourth lens component $d_7 + d_8$
- $v_1$: Abbe's number of the first lens component
- $v_2$: Abbe's number of the second lens component
- $v_3$: Abbe's number of the third lens component Of the above-mentioned conditions, condition (1) is required for preventing flare due to coma from being produced and correcting spherical aberration. The object side surface of the fourth lens component defined by this condition has close relation to spherical aberration and flare due to coma is produced since said surface serves for over-correcting spherical aberration for rays at intermediate field angles. Hence, flare due to coma is produced in a condition of $|r_7| < r_6$ and spherical aberration is under-corrected in a condition of $|r_7| > 1.1r_6$.

The conditions (2) and (3) are necessary to correct flare due to coma and aberrations for paraxial marginal rays. In cases of Gauss type lens systems, especially upper ray of intermediate field angle rays is generally over-corrected. However, these rays are desirable for correcting coma when radii of curvature $r_9$ and $r_{11}$ are long on the image side surfaces of the fourth and fifth lens components since the rays pass through higher sections of the fourth and fifth lens components. However, the paraxial marginal rays also pass the higher sections of said surfaces to produce spherical aberration in under-corrected condition for the paraxial marginal rays. This fact is effective for preventing spherical aberration of the marginal rays from being over-corrected when an object at a short distance is to be photographed. The conditions (2) and (3) are defined for the purposes described above.

If the radii of curvature $r_9$ and $r_{11}$ are shorter than the lower limits of the conditions (2) and (3) respectively, it will be impossible to favorably correct spherical aberration. If the radii of curvature exceed the upper limits of the conditions, coma will not be corrected sufficiently.

The condition (4) is required for correcting astigmatism. Though it is possible to increase aperture ratio as total length of a lens system is prolonged as is already known to the public, the condition (4) is effective, in combination with the next condition (5), for favorably correcting spherical aberration and astigmatism.

If $D_a$ is shorter than the lower limit defined by the condition (4), it will be impossible to sufficiently correct spherical aberration and astigmatism. If $D_a$ exceeds the upper limit of the condition (4), on the other hand, total length of the lens system is prolonged and, in addition, intensity of marginal rays will be insufficient to make it impossible to favorably correct aberrations at marginal portions of an image.

The condition (5) is effective for correcting flare due to coma and serves for enhancing such an effect in combination with the conditions (2) and (3) already described above. If $D_b$ is shorter than the lower limit defined by the condition (5), astigmatism will be under-corrected. If $D_b$ exceeds the upper limit of the condition (5), on the other hand, flare due to coma will be corrected less effectively.

Finally, the condition (6) defines a requirement that the first, second and third lens components should have large Abbe's numbers $\nu_1$, $\nu_2$ and $\nu_3$ respectively for establishing the basis for favorably correcting chromatic aberration of spherical aberration. For the photographic lens system according to the present invention, the condition (6) has been adopted in combination with the conditions (1) through (5) for making it possible to correct said aberration. If $(\nu_1 + \nu_2 - 2\nu_3/2\nu_3)$ has a value smaller than the lower limit (i.e., 0.5) of the condition (6), chromatic aberration will be under-corrected. If said $(\nu_1 + \nu_2 - 2\nu_3/2\nu_3)$ has a value larger than the upper limit of the condition (6), in contrast, it will be impossible to favorably correct chromatic aberration of spherical aberration.

DESCRIPTION OF THE PREFERRED EMBODIMENTS

Embodiment 1

| | | |
|---|---|---|
| $r_1 = 0.6147$ | | |
| $d_1 = 0.1158$ | $n_1 = 1.6204$ | $\nu_1 = 60.3$ |
| $r_2 = 2.9052$ | | |
| $d_2 = 0.0019$ | | |
| $r_3 = 0.4738$ | | |
| $d_3 = 0.0777$ | $n_2 = 1.6935$ | $\nu_2 = 50.8$ |
| $r_4 = 0.8002$ | | |
| $d_4 = 0.0468$ | | |
| $r_5 = 1.0617$ | | |
| $d_5 = 0.0203$ | $n_3 = 1.5814$ | $\nu_3 = 40.8$ |
| $r_6 = 0.2764$ | | |
| $d_6 = 0.3357$ | | |
| $r_7 = -0.2984$ | | |
| $d_7 = 0.0193$ | $n_4 = 1.7552$ | $\nu_4 = 27.5$ |
| $r_8 = 15.8469$ | | |
| $d_8 = 0.1160$ | $n_5 = 1.6935$ | $\nu_5 = 53.3$ |
| $r_9 = -0.5113$ | | |
| $d_9 = 0.0019$ | | |
| $r_{10} = -1.0617$ | | |
| $d_{10} = 0.0890$ | $n_6 = 1.8061$ | $\nu_6 = 40.9$ |
| $r_{11} = -0.4676$ | | |
| $d_{11} = 0.0023$ | | |
| $r_{12} = 1.8784$ | | |
| $d_{12} = 0.0570$ | $n_7 = 1.6935$ | $\nu_7 = 50.8$ |
| $r_{13} = -2.2973$ | | |
| $f = 1.0$ | $f_B = 0.7430$ | |

Embodiment 2

Figure 1:
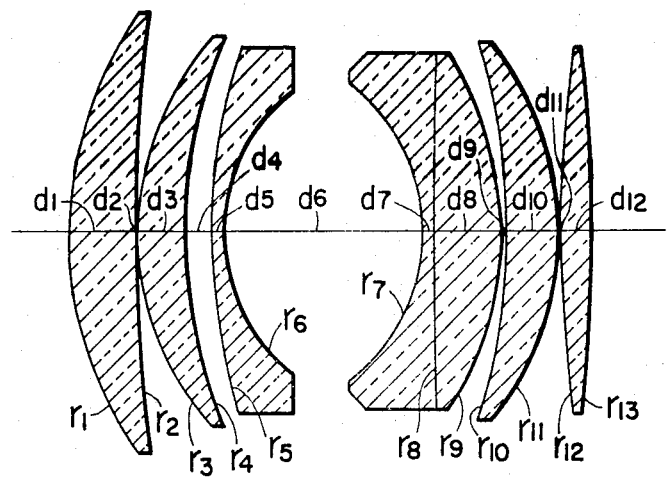
FIG. 1 shows a sectional diagram illustrating the composition of the photographic lens system according to the present invention.
Figures 2A, 2B, 2C, 2D:
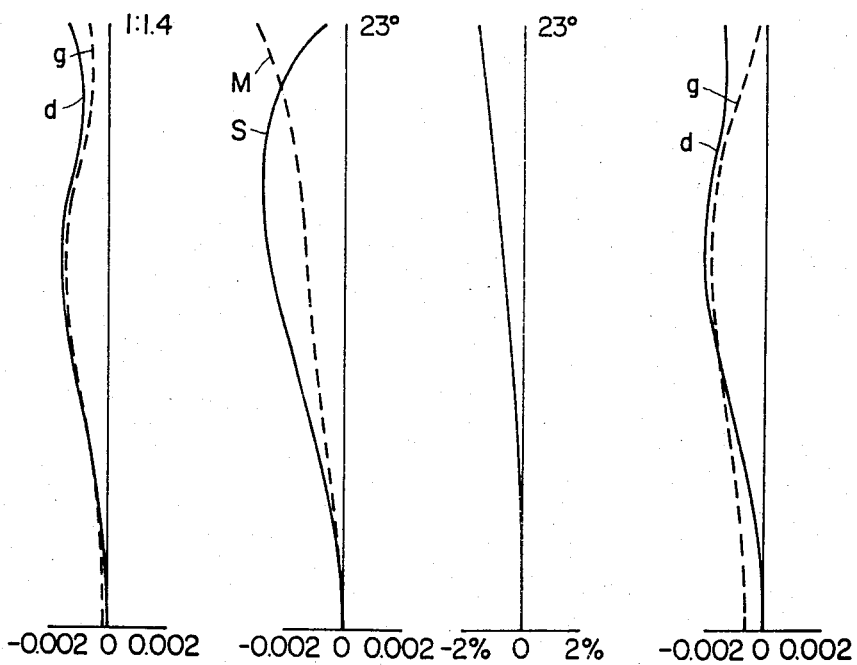
FIG. 2A through FIG. 2D show curves illustrating the aberration characteristics of the Embodiment 1 of the present invention; and FIG. 3A through FIG. 3D shows curves illustrating the aberration characteristics of the Embodiment 2 of the present invention.

| | | |
|---|---|---|
| $r_1 = 0.6278$ | | |
| $d_1 = 0.1137$ | $n_1 = 1.6204$ | $\nu_1 = 60.3$ |
| $r_2 = 2.9900$ | | |
| $d_2 = 0.0019$ | | |
| $r_3 = 0.4580$ | | |
| $d_3 = 0.0834$ | $n_2 = 1.6935$ | $\nu_2 = 50.8$ |
| $r_4 = 0.7235$ | | |
| $d_4 = 0.0426$ | | |
| $r_5 = 0.9466$ | | |
| $d_5 = 0.0203$ | $n_3 = 1.5814$ | $\nu_3 = 40.8$ |
| $r_6 = 0.2723$ | | |
| $d_6 = 0.3374$ | | |
| $r_7 = -0.2953$ | | |
| $d_7 = 0.0193$ | $n_4 = 1.7552$ | $\nu_4 = 27.5$ |
| $r_8 = 86.661$ | | |
| $d_8 = 0.1120$ | $n_5 = 1.6935$ | $\nu_5 = 53.3$ |
| $r_9 = -0.4890$ | | |
| $d_9 = 0.0019$ | | |
| $r_{10} = -1.0792$ | | |
| $d_{10} = 0.0847$ | $n_6 = 1.8061$ | $\nu_6 = 40.9$ |
| $r_{11} = -0.4618$ | | |
| $d_{11} = 0.0023$ | | |
| $r_{12} = 1.8969$ | | |
| $d_{12} = 0.0575$ | $n_7 = 1.6935$ | $\nu_7 = 50.8$ |
| $r_{13} = -2.7516$ | | |
| $f = 1.0$ | $f_B = 0.7424$ | | wherein the reference symbols represent as follows:

$r_1, r_2 \ldots r_{13}$: radii of curvature on the respective surfaces of the lens components $d_1, d_2 \ldots d_{12}$: thicknesses of the respective lens components and airspaces therebetween $n_1, n_2 \ldots n_7$: refractive indices of the respective lens components $\nu_1, \nu_2 \ldots \nu_7$: Abbe's numbers of the respective lens components The aberration characteristics of the Embodiments described above are illustrated respectively in FIG. 2A through FIG. 2D and FIG. 3A through FIG. 3D. As is easily understood from FIG. 2D and FIG. 3D, the lens systems described in the Embodiments 1 and 2 above can assure spherical aberration which is substantially the same for photographing objects at both infinite distance (FIG. 2A and FIG. 3A) and short distance (FIG. 2D and FIG. 3D) and is capable of correcting marginal aberrations.

I claim:

1. A large-aperture photographic lens system comprising a first positive meniscus lens component, a second positive meniscus lens component, a third negative meniscus lens component, a fourth negative cemented meniscus doublet lens component, a fifth positive meniscus lens component and a sixth positive lens component, in which said large-aperture photographic lens system has the following numerical data:

| | | |
|---|---|---|
| $r_1 = 0.6147$ | | |
| $d_1 = 0.1158$ | $n_1 = 1.6204$ | $\nu_1 = 60.3$ |
| $r_2 = 2.9052$ | | |
| $d_2 = 0.0019$ | | |
| $r_3 = 0.4738$ | | |
| $d_3 = 0.0777$ | $n_2 = 1.6935$ | $\nu_2 = 50.8$ |
| $r_4 = 0.8002$ | | |
| $d_4 = 0.0468$ | | |
| $r_5 = 1.0617$ | | |
| $d_5 = 0.0203$ | $n_3 = 1.5814$ | $\nu_3 = 40.8$ |
| $r_6 = 0.2764$ | | |
| $d_6 = 0.3357$ | | |
| $r_7 = -0.2984$ | | |
| $d_7 = 0.0193$ | $n_4 = 1.7552$ | $\nu_4 = 27.5$ |
| $r_8 = 15.8469$ | | |
| $d_8 = 0.1160$ | $n_5 = 1.6935$ | $\nu_5 = 53.3$ |
| $r_9 = -0.5113$ | | |
| $d_9 = 0.0019$ | | |
| $r_{10} = -1.0617$ | | |
| $d_{10} = 0.0890$ | $n_6 = 1.8061$ | $\nu_6 = 40.9$ |
| $r_{11} = -0.4676$ | | |
| $d_{11} = 0.0023$ | | |

-continued

| | | | |
|---|---|---|---|
| $r_{12} = 1.8784$ | | | |
| | $d_{12} = 0.0570$ | $n_7 = 1.6935$ | $v_7 = 50.8$ |
| $r_{13} = -2.2973$ | | | |
| | $f = 1.0$ | $f_B = 0.7430$ | | wherein reference symbols $r_1, r_2, \ldots r_{13}$ respectively represent radii of curvature of respective surfaces of respective lenses, reference symbols $d_1, d_2, \ldots d_{12}$ respectively represent thicknesses of respective lenses and airspaces between respective lenses, reference symbols $n_1, n_2, \ldots n_7$ respectively represent refractive indices of respective lenses, reference symbols $v_1, v_2, \ldots v_7$ respectively represent Abbe's numbers of respective lenses, reference symbol $f$ represents the focal length of the lens system as a whole, reference symbol $f_B$ represents the back focal length of the lens system.

2. A large-aperture photographic lens system comprising a first positive meniscus lens component, a second positive meniscus lens component, a third negative meniscus lens component, a fourth negative cemented meniscus doublet lens component, a fifth positive meniscus lens component and a sixth positive lens component, in which said large-aperture photographic lens system has the following numerical data:

| | | | |
|---|---|---|---|
| $r_1 = 0.6278$ | | | |
| | $d_1 = 0.1137$ | $n_1 = 1.6204$ | $v_1 = 60.3$ |
| $r_2 = 2.9900$ | | | |
| | $d_2 = 0.0019$ | | |
| $r_3 = 0.4580$ | | | |
| | $d_3 = 0.0834$ | $n_2 = 1.6935$ | $v_2 = 50.8$ |
| $r_4 = 0.7235$ | | | |
| | $d_4 = 0.0426$ | | |
| $r_5 = 0.9466$ | | | |
| | $d_5 = 0.0203$ | $n_3 = 1.5814$ | $v_3 = 40.8$ |
| $r_6 = 0.2723$ | | | |
| | $d_6 = 0.3374$ | | |
| $r_7 = 0.2953$ | | | |
| | $d_7 = 0.0193$ | $n_4 = 1.7552$ | $v_4 = 27.5$ |
| $r_8 = 86.661$ | | | |
| | $d_8 = 0.1120$ | $n_5 = 1.6935$ | $v_5 = 53.3$ |
| $r_9 = -0.4890$ | | | |
| | $d_9 = 0.0019$ | | |
| $r_{10} = -1.0792$ | | | |
| | $d_{10} = 0.0847$ | $n_6 = 1.8061$ | $v_6 = 40.9$ |
| $r_{11} = -0.4618$ | | | |
| | $d_{11} = 0.0023$ | | |
| $r_{12} = 1.8969$ | | | |
| | $d_{12} = 0.0575$ | $n_7 = 1.6935$ | $v_7 = 50.8$ |
| $r_{13} = -2.7516$ | | | |
| | $f = 1.0$ | $f_B = 0.7424$ | | wherein reference symbols $r_1, r_2, \ldots r_{13}$ respectively represent radii of curvature of respective surfaces of respective lenses, reference symbols $d_1, d_2, \ldots d_{12}$ respectively represent thicknesses of respective lenses and airspaces between respective lenses, reference symbols $n_1, n_2, \ldots n_7$ respectively represent refractive indices of respective lenses, reference symbols $v_1, v_2, \ldots v_7$ respectively represent Abbe's numbers of respective lenses, reference symbol $f$ represents the focal length of the lens system as a whole, reference symbol $f_b$ represents the back focal length of the lens system.

* * * * *